United States Patent [19]

McGrath et al.

[11] Patent Number: 5,676,615
[45] Date of Patent: Oct. 14, 1997

[54] INDEPENDENTLY STEERABLE DRIVE PULLEY

[75] Inventors: Howard F. McGrath, Springfield; Alan K. Wosky, East Longmeadow, both of Mass.; Patrick H. Robbins, Hudson, N.H.

[73] Assignee: Belt Technologies, Inc., Agawam, Mass.

[21] Appl. No.: 743,985

[22] Filed: Nov. 5, 1996

[51] Int. Cl.⁶ ............................................. F16H 7/20
[52] U.S. Cl. ........................ 474/112; 474/199; 474/101
[58] Field of Search ............................. 474/101, 112, 474/198, 199, 273

[56] References Cited

U.S. PATENT DOCUMENTS

| | | | |
|---|---|---|---|
| 2,536,559 | 1/1951 | Lewis | 474/103 |
| 2,600,273 | 6/1952 | Seifried | 474/103 |
| 2,724,492 | 11/1955 | Kolbe | 474/103 X |
| 3,069,921 | 12/1962 | Davis | 474/103 |
| 5,244,435 | 9/1993 | Billett | 474/184 |
| 5,320,581 | 6/1994 | Avery | 474/101 |
| 5,427,581 | 6/1995 | McGrath et al. | 474/101 |

*Primary Examiner*—Roger J. Schoeppel
*Attorney, Agent, or Firm*—Ross, Ross & Flavin

[57] ABSTRACT

An independently steerable drive pulley is operable by the means of a non-concentric adjustable steering bushing mounted interiorly of a bearing fitted within the bore of the pulley, with the steering bushing and bearing and pulley being mounted on a drive shaft, with a pin and roller assembly for transmitting torque from the drive shaft to the pulley, the steering bushing being adjustable for changing the angular alignment of the pulley with respect to the drive shaft upon which it is mounted, following which adjustment the steering bushing is locked upon the shaft.

10 Claims, 2 Drawing Sheets

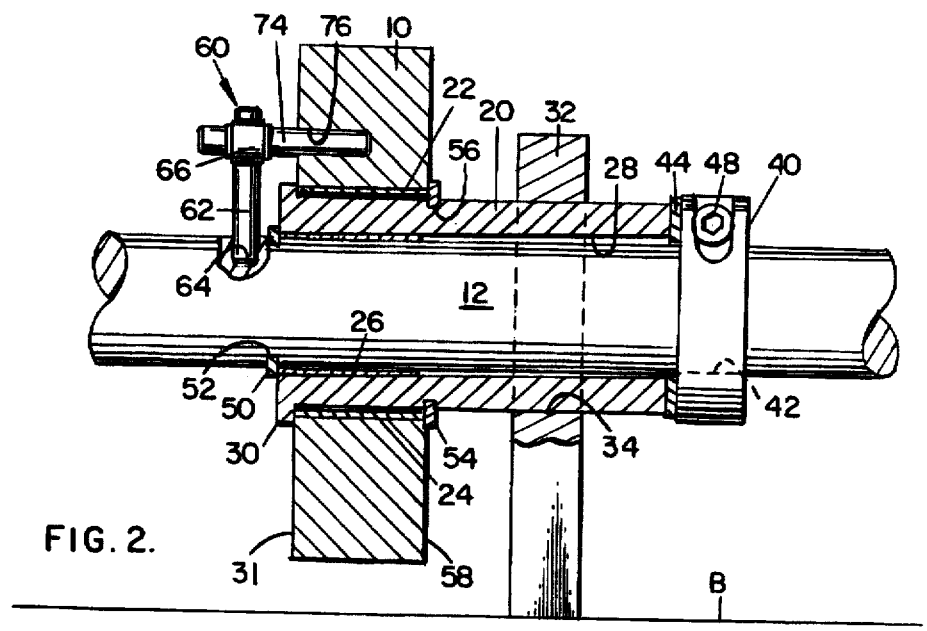
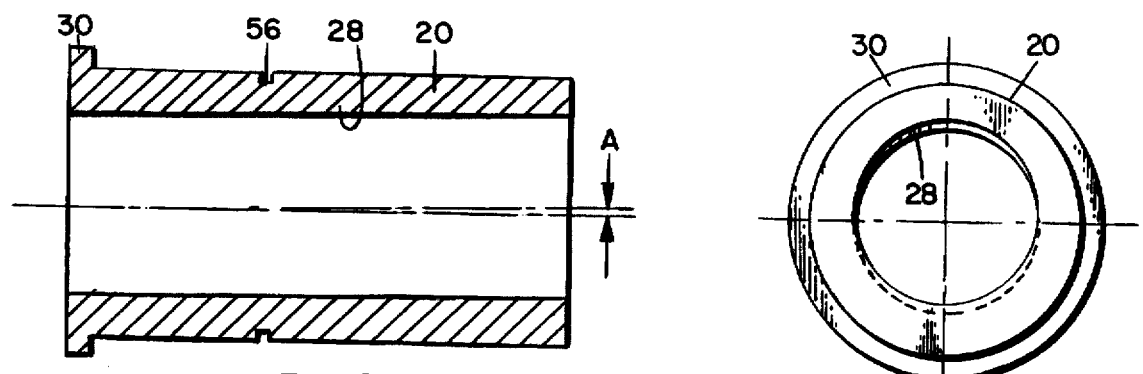
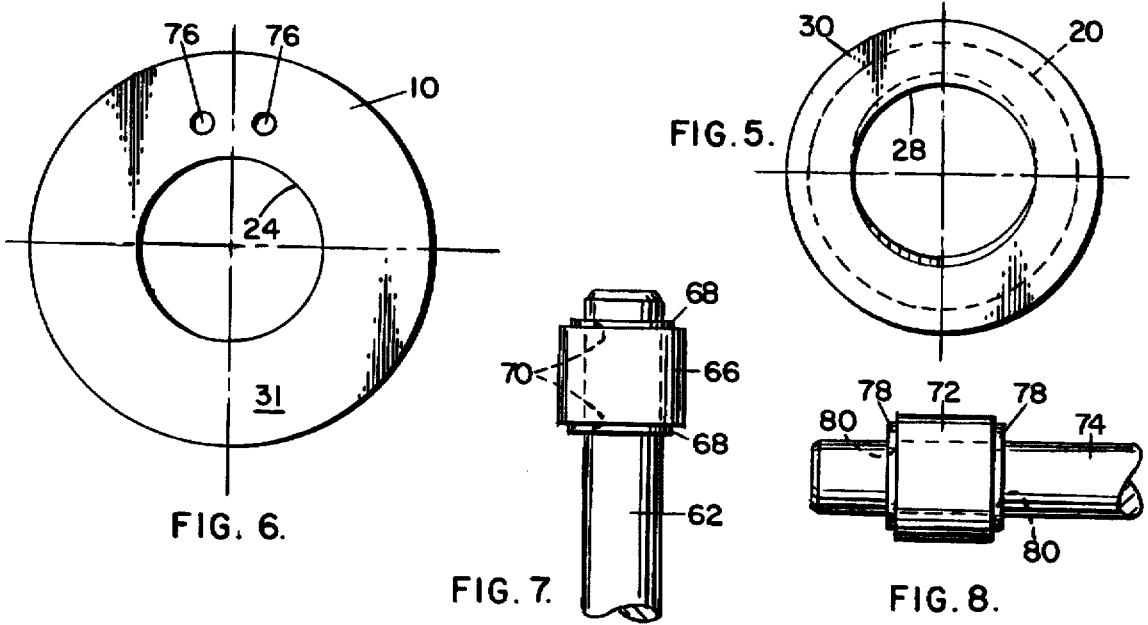

INDEPENDENTLY STEERABLE DRIVE PULLEY

BACKGROUND OF THE INVENTION

1. Field of the Invention

The invention relates generally to pulley systems and more particularly to power transmission and tracking adjustments of belt systems.

2. Description of the Prior Art

Traditionally, belt system tracking adjustments have been accomplished by shimming the drive shaft/motor assembly to achieve alignment for belt tracking. This method of tracking is difficult because of the problems involved in moving this type of assembly precisely.

In addition, tracking adjustments while the system is in operation are not feasible with prior art systems.

In Applicant's prior U.S. Pat. No. 5,427,581, an independently steerable idler pulley is operable by the means of a non-concentric adjustable inner sleeve bushing mounted interiorly of a radial ball bearing fitted within the ID of the pulley, with the sleeve bushing and bearing and pulley press fitted as an assembly for mounting on an idler shaft.

However, the structure as described therein is not appropriate for use with a drive pulley.

SUMMARY OF THE INVENTION

The independently steerable drive pulley of the invention was conceived to simplify the tracking adjustments of all belt types.

The independently steerable drive pulley also allows tracking adjustments to be made with the system in operation; this is not feasible in traditional pulley/belt arrangements.

The structure of the invention consists of two sub-assemblies. The first sub-assembly, the steering bushing, is fitted with a suitable bearing in its bore. This sub-assembly is fitted onto a shaft. Lateral movement of the steering bushing is prevented by an appropriate size snap ring on one side and a shaft collar on the other.

The second sub-assembly consists of a pulley body that is also fitted with a suitable bearing in its bore. The pulley sub-assembly is fitted over the steering bushing and prevented from movement along the shaft direction by a flange on the steering bushing which bears against one side face of the pulley and a snap ring on the outer diameter of the steering bushing which bears against the opposite side face of the pulley.

Pivotal motion is imparted from the steering bushing to the pulley. The steering bushing bore is manufactured at a skew angle relative to its outer diameter. The skew angle provides for a changing eccentricity of the bore to the outer diameter of the bushing. As the bushing is rotated about the shaft, the skew angle is translated to the pulley resulting in the required pivotal motion to track a belt entrained about the pulley.

Typically, in prior art structures, torque is transmitted between the shaft and pulley utilizing a keyway.

However, since herein relative motion is required between these two components, the usual keyway approach employed in prior art structures would be inappropriate.

To accomplish this mode of tracking adjustment for the drive pulley, a unique approach is provided to transmit torque from the shaft to the pulley while permitting relative movement between these two components for tracking purposes.

Herein, torque is transmitted from the drive shaft to the pulley via a pin and roller assembly.

A single pin is pressed into the drive shaft and carries a roller on its free end which is fitted to a pair of rollers carried on the ends of a pair of spaced pins which protrude from a side face of the drive pulley.

This assembly serves two purposes, first, to transmit torque from the drive shaft to the pulley and secondly, to allow for relative motion between the shaft and the pulley.

Since the steering bushing is prevented from rotating by a locking collar, rotary motion between the shaft and steering bushing and pulley and steering bushing is allowed by a set of suitable bearings. Steering adjustments can be made by loosening the locking collar and rotating the steering bushing. Once the desired belt tracking characteristics have been achieved, the locking collar is secured.

The structure of the invention includes:

a shaft mounted drive pulley on which a belt travels;

a steering bushing housed by the pulley, the bore of the steering bushing being manufactured at a "skew" angle;

a suitable bearing disposed between the shaft and the steering bushing to permit rotational motion between the steering bushing and the shaft;

a suitable bearing disposed between the steering bushing and the pulley to permit rotational motion between the steering bushing and the pulley; and a pin/roller assembly on the shaft and pulley for permitting the transmission of torque between the shaft and the pulley.

BRIEF DESCRIPTION OF THE DRAWINGS

FIG. 2 is a fragmentary cross-sectional view, taken through the drive pulley and steering bushing of FIG. 1;

FIG. 3 is a cross-sectional view taken through the steering bushing of the invention;

FIG. 4 is an end elevational view of the steering bushing as seen from the left of FIG. 3;

FIG. 5 is an end elevational view of the steering bushing as seen from the right of FIG. 3;

FIG. 6 is a side elevational view of the drive pulley of FIG. 1;

FIG. 7 is an enlarged fragmentary, front elevational view of the drive shaft pin and roller of FIG. 1; and FIG. 8 is an enlarged, fragmentary, front elevational view of one of the drive pulley pins and rollers of FIG. 1.

DESCRIPTION OF THE PREFERRED EMBODIMENT

Figure 1:
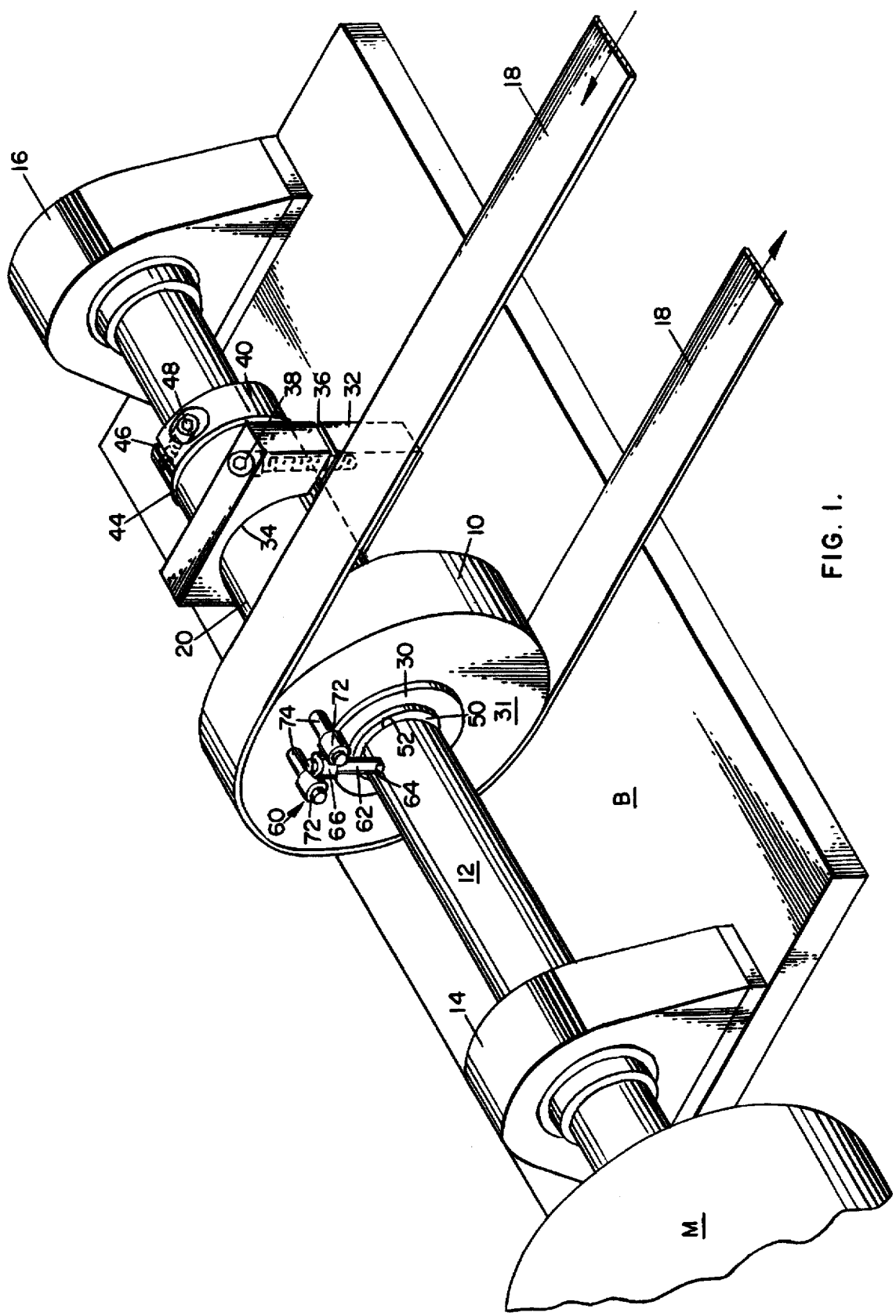
FIG. 1 is a perspective view of a drive pulley and steering bushing embodying the invention mounted upon a drive shaft illustrating the dynamic tracking of a belt.

With reference to FIG. 1 of the drawings, a drive pulley 10 is mounted on a drive shaft 12 supported at its opposite ends by pillow block assemblies 14 and 16 fixed to a base B and driven by such as a motor M.

Drive pulley 10 drives a belt 18 entrained therearound and entrained at its opposite end around a shaft mounted idler pulley, not shown.

As best seen in FIG. 2, pulley 10 sleeves a steering bushing 20 which, in turn, sleeves drive shaft 12.

A suitable bearing 22 is fitted in a bore 24 of pulley 10 and sleeves the outer diameter of steering bushing 20 to permit relative rotation between the pulley and the steering bushing.

A suitable bearing 26 is fitted in a bore 28 of steering bushing 20 and sleeves the outer diameter of shaft 12 to permit relative rotation between the shaft and the steering bushing.

Steering bushing 20 has an integral annular flange 30 at one end which bears against a side face 31 of pulley 10 and is lockingly supported approximately midway of its length by an upright locking collar 32 spaced from pulley 10.

Locking collar 32 has a central bore 34 adapted to embrace the outer periphery of steering bushing 20 and is secured at its lower end to base B.

Locking collar 32 is horizontally split at its forward face to provide a gap 36 which extends inwardly into the locking collar and communicates with locking collar central bore 34.

A downwardly extending bolt 38 threaded in the locking collar bridges gap 36 and, upon appropriate rotation in one direction is adapted to close the gap to bring the locking collar into tightly embracing relation to the outer periphery of steering bushing 20 to preclude rotation of the steering bushing relative to shaft 12.

Rotation of bolt 38 in an opposite direction is adapted to open gap 36 permitting the rotation of steering bushing 20 relative to shaft 12.

An annular shaft collar 40 having an annular bore 42 is sleeved on shaft 12 in spaced relation to locking collar 32 and, together with a thrust washer 44, engages the inner end of steering bushing 20.

Shaft collar 40 is vertically split at its upper end to provide a gap 46 which extends inwardly into the shaft collar and communicates with shaft collar bore 42.

An inwardly extending bolt 48 threaded in shaft collar 40 bridges gap 46 and, upon appropriate rotation in one direction, is adapted to close the gap to bring the shaft collar into tightly embracing relation to shaft 12 to preclude lateral movement of steering collar 20 to the right relative to the shaft as seen in FIGS. 1 and 2.

Rotation of bolt 48 in an opposite direction is adapted to open gap 46 to permit lateral movement of shaft collar 40 to the right relative to shaft 12 as seen in FIGS. 1 and 2.

A first snap ring 50 is disposed in a groove 52 in the outer diameter of shaft 12 and bears against flange 30 of steering bushing 20 to preclude lateral movement of the steering bushing to the left relative to shaft 12 as seen in FIGS. 1 and 2.

A second snap ring 54 is disposed in a groove 56 in the outer diameter of steering bushing 20 and bears against a side face 58 of pulley 10 and, together with flange 30 of the steering bushing, precludes lateral movement of pulley 10 in either direction relative to the steering bushing and relative to shaft 12.

Bore 28 of steering bushing 20 is concentric relative to shaft 12 at one end of the bushing and eccentric relative to the shaft at the opposite end of the bushing to provide a constantly changing bore eccentricity.

Thus, the eccentricity through the bushing length gradually varies from true concentricity at one end to non-concentricity at the opposite end so as to define a skew angle A as seen in FIG. 3 which allows the requisite pivotal movement desired for the proper tracking of belt 18 being trained over pulley 10.

Operationally, as the bushing rotates about its axis, the skew angle is translated to the pulley. In this way the pivotal motion will allow the tracking of the belt.

To accomplish this mode of tracking adjustment for the drive pulley, a pin/roller assembly 60 transmits torque from shaft 12 to pulley 10 and still allows for relative movement between these two components for tracking purposes.

As best seen in FIGS. 1, 2 and 7, pin roller assembly 60 includes a shaft pin 62 having one end press fit into a provided opening 64 in shaft 12 adjacent flange 30 of steering bushing 20 and having a roller 66 rotatably sleeved on its outer free end, the roller being restrained from movement along pin 62 by snap rings 68 disposed in spaced peripheral grooves 70 provided in the outer periphery of the shaft pin.

As best seen in FIGS. 1, 2 and 6, roller 66 on shaft pin 62 is positioned between and contacts a pair of spaced rollers 72, 72 provided on the outer free ends of a pair of spaced pins 74, 74 which extend horizontally outwardly from side face 31 of pulley 10.

The opposite ends of pins 74, 74 are press fit into spaced openings 76, 76 which extend into the body of pulley 10 from side face 31.

As seen in FIG. 8, each roller 72 is restrained from movement along its respective pin 74 by snap rings 78 disposed in spaced peripheral grooves 80 provided in the outer periphery of each pin 74.

Pin/roller assembly 60 serves two purposes, first, to transmit torque from drive shaft 12 to pulley 10, and secondly, to allow for relative motion between the shaft and the pulley.

Since steering bushing 20 is prevented from rotating by locking collar 32, rotary motion between shaft 12 and the steering bushing and between pulley 10 and the steering bushing is allowed by the set of bearings 22 and 26. Steering adjustments are made by loosening locking collar bolt 38 and rotating steering bushing 20. Once the desired belt tracking characteristics have been achieved, bolt 38 is retightened to secure the locking collar to the steering bushing to preclude further rotation of the steering bushing.

The invention hereof utilizes a bushing having a bore fabricated at a skew angle with respect to its outer diameter. The skew angle allows a constantly changing eccentricity of the bushing bore relative to the bushing outer diameter.

As the bushing is rotated about its axis, the skew angle is translated to the pulley, all leading to the required pivotal motion to track a belt.

We claim:

1. An independently steerable drive pulley for accommodating a belt relative to a drive shaft comprising in combination:

a pulley over which the belt travels, a non-concentric steering bushing, a bearing disposed between the pulley and steering bushing for allowing rotational motion between the pulley and steering bushing, a bearing disposed between the steering bushing and the drive shaft for allowing rotational motion between the steering bushing and the drive shaft, the pulley and steering bushing and bearings being mounted on the drive shaft, the steering bushing being lockably adjustable relative to the drive shaft for proper tracking of the belt, and means for transmitting torque from the drive shaft to the pulley.

2. An independently steerable drive pulley according to claim 1, wherein the steering bushing has a bore which varies from true concentricity at one end to non-concentricity at its opposite end to define a skew angle which allows its pivotal movement and positioning for the proper tracking of the belt.

3. An independently steerable drive pulley according to claim 1, wherein the means for transmitting torque from the drive shaft to the pulley comprises a roller mounted on the drive shaft engageable with a pair of rollers mounted on the pulley.

4. An independently steerable drive pulley according to claim 1, including means for locking the steering bushing against rotation relative to the shaft.

5. An independently steerable drive pulley according to claim 4, wherein the means for locking the steering bushing against rotation is a stationary locking collar releasably secured to the steering bushing.

6. An independently steerable drive pulley according to claim 1, including means for locking the steering bushing against transverse movement relative to the drive shaft.

7. An independently steerable drive pulley according to claim 6, wherein the means for locking the steering bushing against transverse movement relative to the drive shaft comprises a shaft collar releasably fixed to the drive shaft and engaging one end of the steering bushing and a snap ring fixed to the drive shaft and spaced from the shaft collar engaging the opposite end of the steering bushing.

8. An independently steerable drive pulley according to claim 1, including means for locking the pulley against transverse movement relative to the drive shaft.

9. An independently steerable drive pulley according to claim 8, wherein the means for locking the pulley against transverse movement relative to the drive shaft comprises a collar on the steering bushing embracing one side face of the pulley and a snap ring on the steering bushing embracing an opposite side face of the pulley.

10. An independently steerable drive pulley for accommodating a belt relative to a drive shaft comprising in combination:

a pulley over which the belt travels, a non-concentric steering bushing having a bore which varies from true concentricity at one end to non-concentricity at its opposite end to define a skew angle, a bearing disposed between the pulley and steering bushing for allowing rotational motion between the pulley and steering bushing, a bearing disposed between the steering bushing and the drive shaft for allowing rotational motion between the steering bushing and the drive shaft, the pulley and steering bushing and bearings being mounted on the drive sahft, means for transmitting torque from the drive shaft to the pulley, the steering bushing being adjustably lockable and pivotable relative to the drive shaft for positioning the pulley for proper tracking of the belt.

* * * * *